United States Patent
Kolb, Jr. et al.

[15] 3,644,042
[45] Feb. 22, 1972

[54] LASER SYSTEM FOR MONITORING THE MOTION OF OBJECTS

[72] Inventors: William P. Kolb, Jr., Manhattan Beach; Frank E. Goodwin, Malibu, both of Calif.

[73] Assignee: Hughes Aircraft Company, Culver City, Calif.

[22] Filed: June 15, 1970

[21] Appl. No.: 46,080

[52] U.S. Cl. ..................................356/5, 356/28, 356/106 R
[51] Int. Cl. ..........................................G01c 3/08, G01p 3/36
[58] Field of Search ...........................356/4, 5, 28, 106 R; 331/94.5 G

[56] References Cited

UNITED STATES PATENTS

| | | | |
|---|---|---|---|
| 3,487,327 | 12/1969 | Clark | 331/94.5 |
| 3,492,600 | 1/1970 | Zitter | 331/94.5 |
| 3,395,606 | 8/1968 | Neill | 331/94.5 |
| 3,333,101 | 7/1967 | Bell | 331/94.5 G |
| 3,409,369 | 11/1968 | Bickel | 356/28 |

Primary Examiner—Rodney D. Bennett, Jr.
Assistant Examiner—S. C. Buczinski
Attorney—James K. Haskell and Paul M. Coble

[57] ABSTRACT

The motion of an object may be monitored by directing a laser beam at both $3.39\mu$ and $0.6328\mu$ from a helium-neon laser oscillator toward the object to be monitored in such manner that a portion of the laser beam is reflected by the object back into the laser, causing the laser to produce output laser energy at $0.6328\mu$ which varies significantly in intensity in accordance with the motion of the object. The number of intensity maxima and minima is indicative of the distance moved, while the number of maxima and minima per unit time is indicative of the velocity of movement. The $0.6328\mu$ output laser energy may be detected and processed electrically to obtain distance- and velocity-indicating signals. A laser amplifier may be disposed in the path of the laser beam to extend the range of the system and/or enable monitoring of lower reflectivity objects.

11 Claims, 3 Drawing Figures

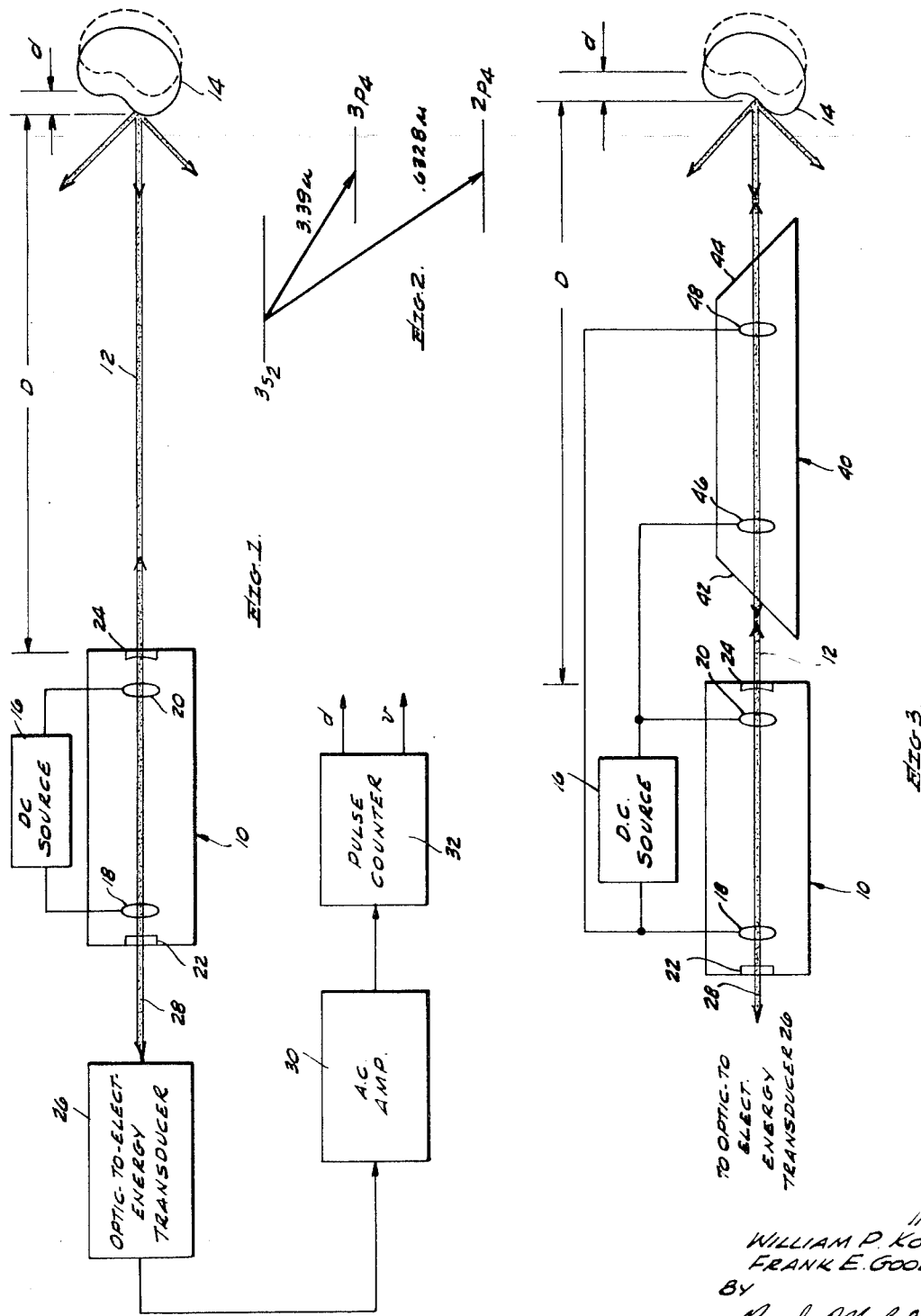

LASER SYSTEM FOR MONITORING THE MOTION OF OBJECTS

This invention relates to lasers, and more particularly relates to a laser system for monitoring the motion of an object by feeding laser energy reflected from the object back into the laser so as to vary the intensity of laser oscillation in accordance with the motion of the object.

In a paper by V. J. Zaleckas entitled "Interferometric Monitoring of Miniature Relay Armature Motion," presented at the Conference on Laser Engineering and Application, Washington D.C., June 1969, an arrangement for monitoring the motion of an object by means of a laser beam is disclosed. This arrangement employs a modified Michelson interferometer in which a laser is used as the light source, while the object being monitored constitutes one of the interferometer reflectors. An optical detector located at the interference fringe observation point produces an electrical signal of an amplitude determined by the phase of the laser energy arriving at the detector via the object relative to that of the detected laser energy which was not reflected by the object. The detected signal is then electrically processed to provide velocity and distance of movement information for the object.

The aforementioned and other interferometric motion-monitoring systems are highly sensitive to the reflectivity of the object being monitored at the laser wavelength employed. In order to insure sufficient reflection of laser energy from the object being monitored, it is necessary to interpose a converging lens in front of the object in order to focus the laser light into as small an area as possible on the object surface. However, since good focusing is achieved only when the object is in the vicinity of the focal point of the lens, a limitation is imposed on the object distances over which such interferometric motion-monitoring arrangements may be satisfactorily employed.

Accordingly, it is an object of the present invention to provide a laser system for monitoring the motion of objects having nonspecular surfaces and of lower reflectivities than has been possible with prior art motion-monitoring laser systems.

It is a further object of the invention to provide a laser system for monitoring the motion of a relatively low-reflectivity object over a wider range of distances than has been achieved with prior art laser arrangements.

It is still another object of the invention to provide a motion-monitoring laser system which is simpler in design and which requires fewer parts than the prior art.

In a motion-monitoring system according to the invention, a laser oscillator including a laser medium generates a laser beam which is transmitted toward the object to be monitored in such manner that a portion of the laser beam is reflected by the object back into the laser medium, causing the laser medium to produce output laser energy which varies significantly in intensity in accordance with the motion of the object. An electrical signal indicative of the object motion is derived from the varying intensity output laser energy.

In a preferred embodiment of the invention, in which a helium-neon laser medium is employed, the laser beam transmitted to the object includes energy having an wavelength of essentially $3.39\mu$ as well as energy having a wavelength of essentially $0.6328\mu$, while the output laser energy from which the electrical signal is derived primarily has a wavelength of essentially $0.6328\mu$.

Additional objects, advantages and characteristic features of the invention will become apparent from the following detailed description of preferred embodiments of the invention when considered in conjunction with the accompanying drawing in which:

FIG. 1 schematically illustrates a motion-monitoring laser system in accordance with one embodiment of the invention;

FIG. 2 is an energy level diagram illustrating laser transitions in neon which are utilized in the operation of the laser in the system of FIG. 1; and FIG. 3 schematically illustrates a portion of a motion-monitoring laser system in accordance with another embodiment of the invention.

Referring to FIG. 1 with greater particularity, a motion-monitoring system according to the invention may be seen to include a laser oscillator 10 which transmits an output laser beam 12 toward an object 14 to be monitored. A portion of the laser beam 12 incident on the object 14 is reflected by object 14 back along the path of beam 12 into the laser 10. The active medium for the laser 10 is preferably a mixture of helium and neon which is excited to a lasing state by means of a DC power source 16 connected between laser tube electrodes 18 and 20. A regenerative optical cavity is provided for the laser 10 by means of reflectors 22 and 24 disposed at opposite ends of the laser 10.

When a helium-neon mixture is used as the laser medium, the laser 10 is preferably designed to utilize laser wavelengths of both $3.39\mu$ and $0.6328\mu$. As may be seen from FIG. 2, the $3.39\mu$ laser line is generated by a transition from the neon $3s_2$ state (Paschen notation) to the neon $3p_4$ state. However, the $3s_2$ state also constitutes the starting level for the $0.6328\mu$ (visible) transition which terminates in the neon $2p_4$ level. Thus, it will be apparent that when a helium-neon laser is operating to produce $3.39\mu$ radiation, radiation at $0.6328\mu$ is usually present also, the relative intensities of these two laser lines being determined by the relative effective reflectivities of the laser optical cavity for energy at these two wavelengths.

As will be explained more fully below, it is desirable that return energy from the object 14 which is fed back into the laser 10 be at a wavelength of $3.39\mu$. However, it is also desirable that some of the return energy be in the visible portion of the electromagnetic spectrum, because actual viewing of return light greatly facilitates proper aiming of the laser toward the object. Thus, it is preferred that the laser beam 12 contain energy at wavelengths of both $3.39\mu$ and $0.6328\mu$. This may be achieved by using reflectors 22 and 24 for the laser 10 which have a reflectivity of approximately 99 percent and a transmissivity of approximately 1 percent for light at $0.6328\mu$ and have a reflectivity essentially in the range of from 10 percent to 20 percent and a transmissivity essentially ranging from 90 percent to 80 percent for light at $3.39\mu$. Moreover, as shown in FIG. 1, the laser optical cavity may be designed with one of the reflectors such as 22 having a flat reflective surface and the other reflector such as 24 having a curved reflective surface, the radius of curvature being slightly greater than the distance between the reflectors 22 and 24. For example, for a reflector separation of 29 cm. the radius of curvature of reflector 24 may be 30 cm.

When the laser 10 is constructed so that the beam 12 contains energy at both $3.39\mu$ and $0.6328\mu$, it is preferable to design the laser 10 so that laser oscillation at $3.39\mu$ is confined to only a single longitudinal mode, while oscillation at $0.6328\mu$ may exist in a plurality of modes. This may be achieved by insuring that the longitudinal mode frequency separation $\Delta\nu$ ($\Delta\nu = c/2L$ where $c$ is the velocity of light and $L$ is the reflector separation) is greater than the Doppler broadened linewidth for $3.39\mu$ laser energy. Since the Doppler broadened linewidth for the $3.39\mu$ laser transition is approximately 310 MHz, only a single longitudinal mode of laser oscillation will exist for this transition when the reflector separation is less than approximately 48 cm. Thus, in a preferred embodiment of the invention, the separation between reflectors 22 and 24 of the laser 10 is less than about 48 cm., and preferably around 29 cm. Since the Doppler broadened linewidth for the $0.6328\mu$ laser transition is approximately 1,500 MHz, this reflector separation will permit a plurality of longitudinal modes of $0.6328\mu$ oscillation to exist.

As has been mentioned above, since both the $3.39\mu$ and the $0.6328\mu$ helium-neon laser lines have the same upper transition level, a competition effect occurs between these lines. Thus, if the effective reflectivity of the laser optical cavity is altered so as to favor the $3.39\mu$ transition, the population of the $3s_2$ neon level will be depleted at the expense of $0.6328\mu$ transition.

In the motion-monitoring system of FIG. 1, as laser energy is reflected by the object 14 back into the laser 10, the effective reflectivity of the laser optical cavity is altered in accordance with the phase of the laser return energy. Thus, if object 14 is located at a distance D from the laser 10 corresponding to an integral multiple of a half wavelength at $3.39\mu$, the return energy will be in phase with the emitted energy, thereby maximizing oscillation at $3.39\mu$ and minimizing oscillation at $0.6328\mu$. On the other hand, if the object-to-laser distance D corresponds to an odd multiple of a quarter wavelength at $3.39\mu$, the return energy will be 180° out of phase with respect to the emitted energy, thereby minimizing oscillation at $3.39\mu$ and maximizing oscillation at $0.6328\mu$.

When the object 14 moves away from (or toward) the laser 10 by a distance $d$, the intensity of laser oscillation at $3.39\mu$ will exhibit a maximum and a minimum for each half wavelength ($3.39\mu/2$) moved over the distance $d$. Thus, the number N of maxima and minima in the intensity of the laser oscillation at $3.39\mu$ is indicative of the distance of movement $d$. The number of maxima and minima per unit time is indicative of the velocity of movement $v$ of the object 14, while the time rate of change of the velocity is representative of the object acceleration.

As has been mentioned above, due to the aforementioned competition effect between the $3.39\mu$ transition and the $0.6328\mu$ transition, when the intensity of the $3.39\mu$ line increases the intensity of the $0.6328\mu$ line decreases, and vice versa. However, due to the considerably higher laser gain at $3.39\mu$ a relatively small change in the intensity of the $3.39\mu$ energy fed back into the laser active medium gives rise to a relatively large change in the intensity of the generated $0.6328\mu$ line. Thus, changes in the intensity of the $3.39\mu$ oscillation in laser 10 resulting from movement of the object 14 can be more readily monitored by detecting changes in the intensity of the $0.6328\mu$ output laser energy.

A specific arrangement for detecting changes in the $0.6328\mu$ output from laser 10 due to movement of the object 14 and for processing the detected signal electrically to obtain object distance and/or velocity information is shown in FIG. 1. An optic-to-electric energy transducer 26 is disposed so as to receive an output laser beam 28 from the laser 10 and provide an electrical signal having an amplitude proportional to the intensity of the laser beam 28. Although the transducer 26 is shown as receiving a laser beam emitted from the opposite end of the laser 10 as that from which the beam 12 is emitted, alternatively, the transducer could be disposed so as to receive a portion of the beam 12. For the aforementioned embodiment of invention wherein laser energy at $0.6328\mu$ is to be detected, the transducer 26 should be highly sensitive to light in the visible portion of the electromagnetic spectrum. Examples of suitable devices for transducer 26 are the silicon photodiode, photocell, photomultiplier, etc.

The output from the optic-to-electric energy transducer 26 is fed via an AC amplifier 30, which may be a $\mu$A709 operational amplifier for example, to a pulse counter 32 which provides an indication of the number of intensity maxima and minima experienced by laser beam 28. Since the number of these maxima and minima is indicative of the distance of movement $d$ of object 14, as explained above, the total pulse count of the counter 32 is representative of the distance $d$. By gating the counter 32 so that it counts the number of maxima and minima occurring within a predetermined period of time, such as one second, an output signal indicative of the distance moved per unit time, i.e., the velocity $v$ of the object 14, may be obtained.

In accordance with another embodiment of the invention, illustrated in FIG. 3, a laser amplifier 40 is disposed in the path of the laser beam 12 between the laser oscillator 10 and the object 14 in order to amplify the beam 12. When the active medium for the laser oscillator 10 is helium-neon, the laser tube for the amplifier 40 should also contain a helium-neon mixture and have Brewster angle windows 42 and 44 at its opposite ends. Excitation for the laser amplifier 40 may be obtained by connecting laser tube electrodes 46 and 48 to the DC power source 16 or to a separate power source if more convenient. Use of the laser amplifier 40, with its high gain at $3.39\mu$, enables the system of the invention to monitor objects 14 of lower reflectivity and located at greater distances from the laser 10 than would be possible in the absence of amplifier 40.

Since laser energy reflected by the object 14 is actually fed back into the active medium of the laser oscillator 10, the laser 10 is able to provide output laser energy which varies significantly in intensity in accordance with the motion of the object 14. Thus, relatively large amplitude velocity- and distance-indicating signals may be obtained even when the surfaces of the object 14 are nonspecular and of relatively low reflectivity. Moreover, since a lens is not required for focusing the laser beam 12 onto a surface of the object 14, the laser-to-object distance is not critical, and a motion-monitoring system according to the invention is operable over a wider range of object distances than has been achieved with lens-utilizing motion-monitoring laser systems of the prior art. In addition, the system of the invention is simpler in design and requires fewer parts than the prior art.

Although the invention has been shown and described with reference to particular embodiments, nevertheless various changes and modifications obvious to a person skilled in the art to which the invention pertains are deemed to lie within the spirit, scope and contemplation of the invention.

What is claimed is:

1. A system for monitoring the motion of an object comprising:

means including a laser medium and a pair of reflectors disposed at opposite ends of said medium for generating a laser beam and transmitting said beam toward the object to be monitored such that a portion of said laser beam is reflected by said object back through one of said reflectors and into said laser medium while said object is moved with at least a component of motion along a direction parallel to the laser beam path to cause said medium to produce output laser energy which varies in intensity in accordance with the phase of the laser beam returned from said object relative to that of the transmitted laser beam as determined by the aforesaid motion of said object; and means for deriving from the output laser energy produced as a result of said object motion an electrical signal indicative of the motion of said object.

2. A motion-monitoring system according to claim 1 wherein said laser medium comprises a mixture of helium and neon, and wherein said laser beam includes energy having a wavelength of approximately $3.39\mu$.

3. A motion-monitoring system according to claim 2 wherein the output laser energy produced as a result of said object motion primarily has a wavelength of approximately $0.6328\mu$.

4. A motion-monitoring system according to claim 1 wherein said laser medium comprises a mixture of helium and neon, and wherein said laser beam includes energy having a wavelength of approximately $0.6328\mu$.

5. A motion-monitoring system according to claim 1 wherein said laser medium comprises a mixture of helium and neon, and wherein said laser beam includes energy having a wavelength of approximately $3.39\mu$ and energy having a wavelength of approximately $0.6328\mu$.

6. A motion-monitoring system according to claim 5 wherein the output laser energy produced as a result of said object motion primarily has a wavelength of approximately $0.6328\mu$.

7. A motion-monitoring system according to claim 5 wherein each of said reflectors has a reflectivity of essentially 99 percent and a transmissivity of essentially 1 percent for electromagnetic energy of a wavelength around $0.6328\mu$ and has a reflectivity essentially in the range of from 10 percent to 20 percent and a transmissivity essentially in the range of from 90 percent to 80 percent for electromagnetic energy of a wavelength around $3.39\mu$.

8. A motion-monitoring system according to claim 5 wherein said reflectors are separated by a distance such that laser oscillation at approximately the wavelength $3.39\mu$ is confined to only a single longitudinal mode.

9. A motion-monitoring system according to claim 8 wherein said reflectors are separated by a distance of about 29 cm.

10. A motion-monitoring system according to claim 1 and further including laser amplifier means disposed in the path of said laser beam for amplifying said laser beam.

11. A motion-monitoring system according to claim 2 wherein a helium-neon laser amplifier is disposed in the path of said laser beam to amplify said laser beam.

* * * * *